United States Patent
Beshai

(10) Patent No.: US 6,646,986 B1
(45) Date of Patent: Nov. 11, 2003

(54) SCHEDULING OF VARIABLE SIZED PACKET DATA UNDER TRANSFER RATE CONTROL

(75) Inventor: Maged E. Beshai, Stittsville (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/417,769

(22) Filed: Oct. 14, 1999

(51) Int. Cl.[7] .............................................. H04L 12/00
(52) U.S. Cl. .................. 370/230.1; 370/235; 370/395.4
(58) Field of Search .............................. 370/229, 230.1, 370/232, 235, 230, 412, 429; 710/29; 455/450

(56) References Cited

U.S. PATENT DOCUMENTS

| | | | |
|---|---|---|---|
| 5,905,730 A | * | 5/1999 | Yang et al. ................. 370/429 |
| 5,926,459 A | * | 7/1999 | Lyles et al. ................. 370/230 |
| 6,041,040 A | * | 3/2000 | Beshai et al. ................ 370/232 |
| 6,438,132 B1 | * | 8/2002 | Vincent et al. ........ 370/395.42 |

FOREIGN PATENT DOCUMENTS

WO     WO 98/46037     10/1998

* cited by examiner

Primary Examiner—Hassan Kizou
Assistant Examiner—Andrew M. Waxman

(57) ABSTRACT

The invention relates to scheduling packets from numerous traffic classes that share a common high speed channel. A method and an apparatus for regulating several thousand traffic classes sharing a very high speed common channel of a capacity of the order of 80 Gb/s are described. The packets are generally of variable size, and each channel is assigned a transfer rate less than or equal to the capacity of shared channel, with the sum of transfer rates of all classes not exceeding the capacity of the shared channel. The rare allocation for each class is determined either by operator specification or, preferably, by automated means based on traffic monitoring. In the latter case, the transfer rate allocated to a class may be dynamically updated.

22 Claims, 13 Drawing Sheets

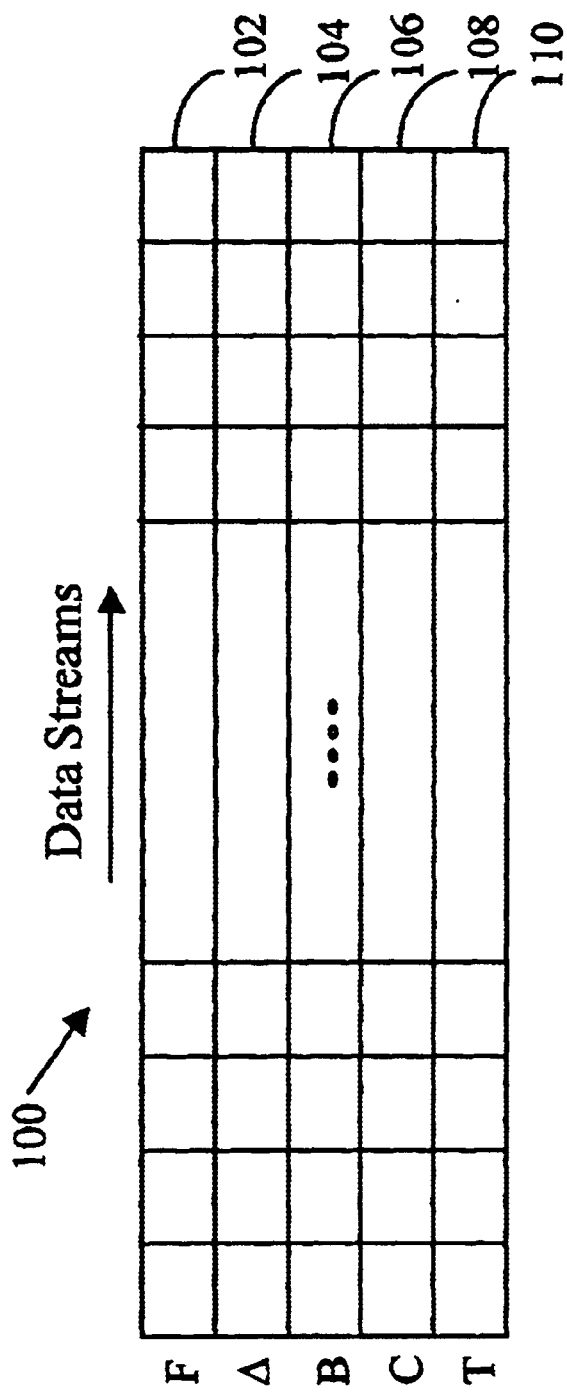
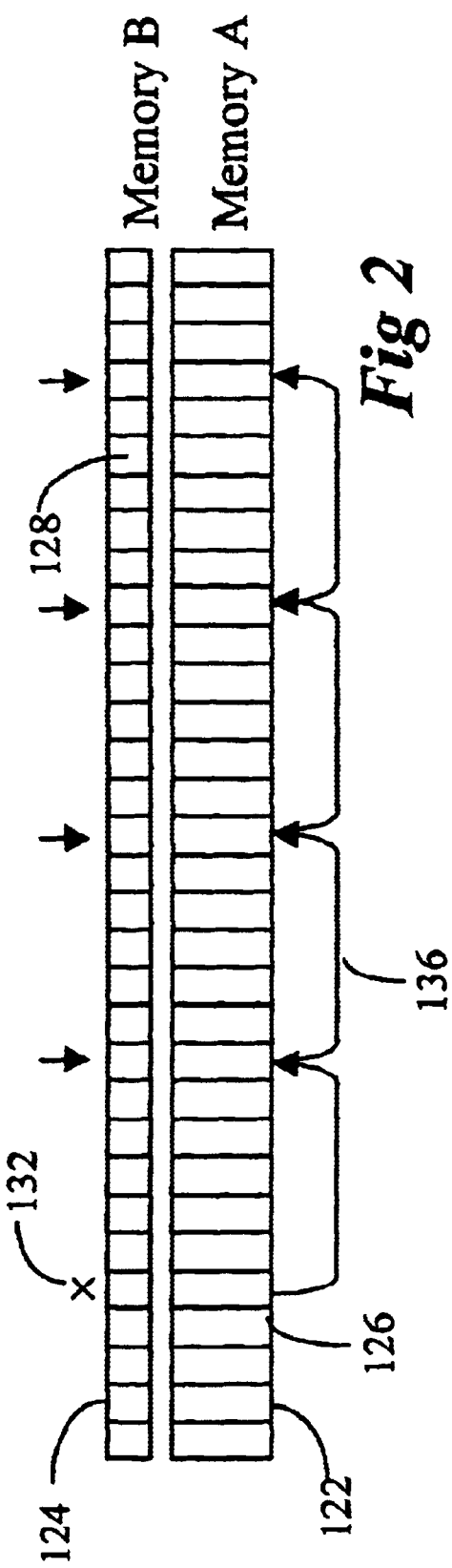

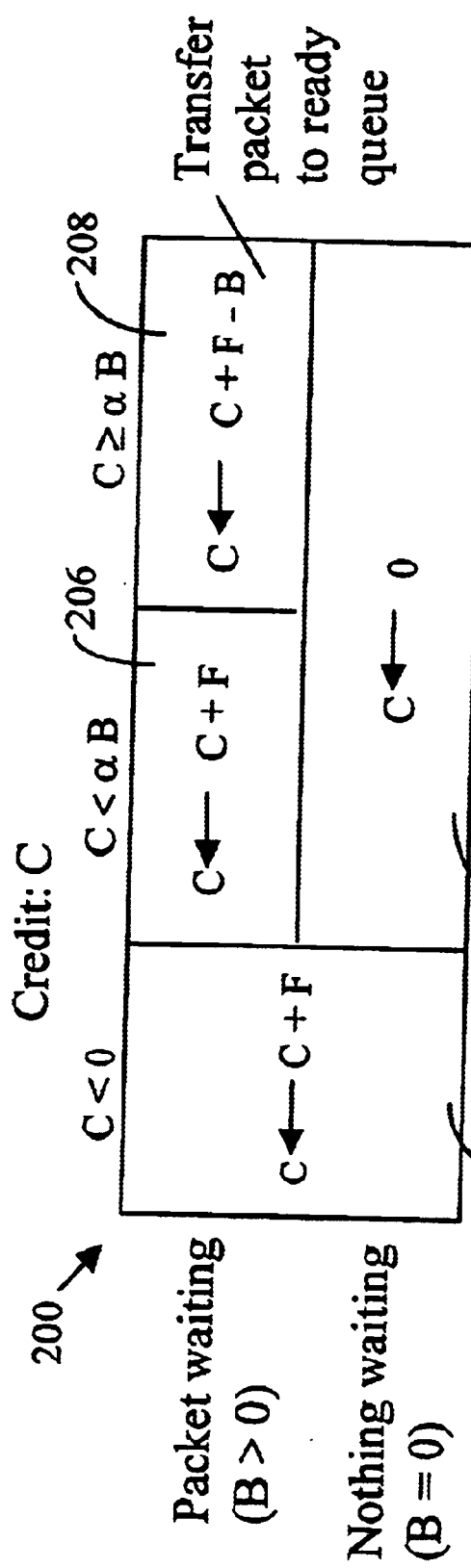
*Fig 3* ($0 \leq \alpha \leq 1$)
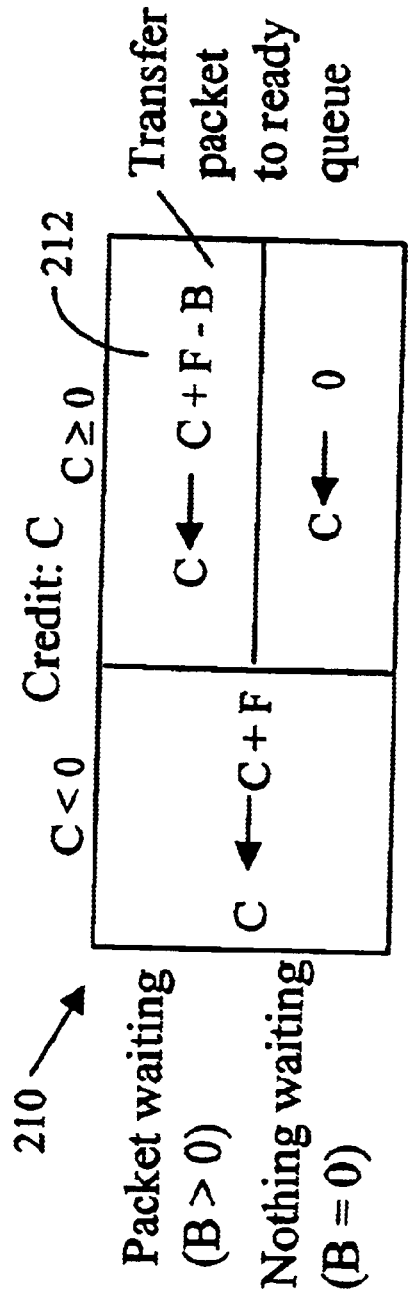
*Fig 4* ($\alpha = 0$)

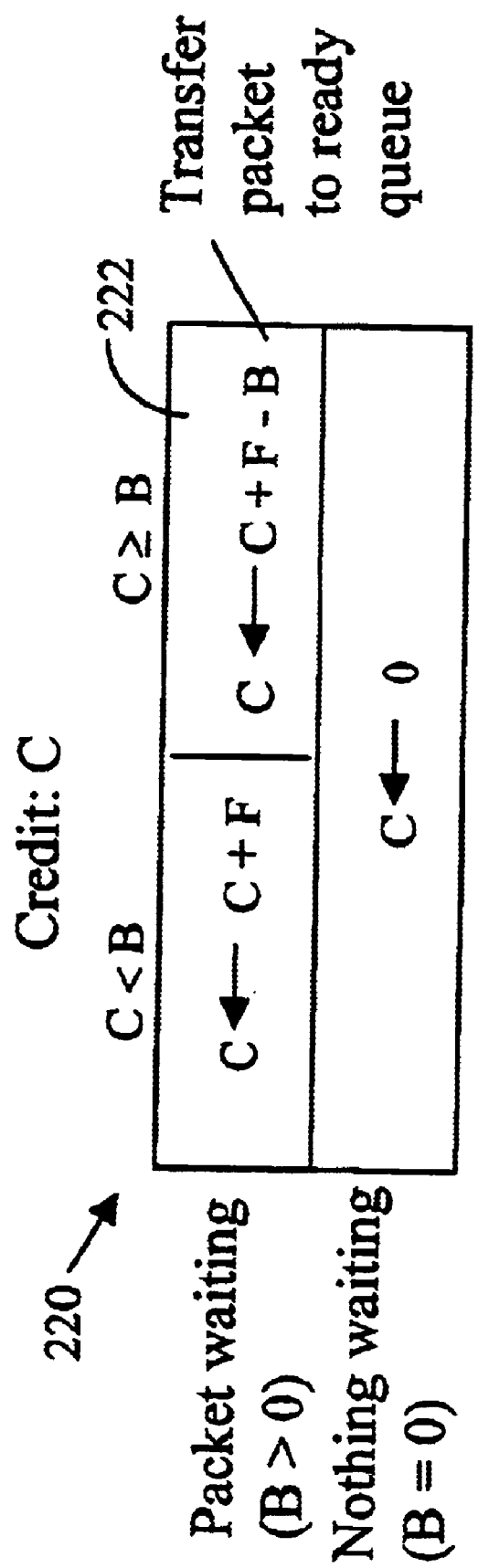

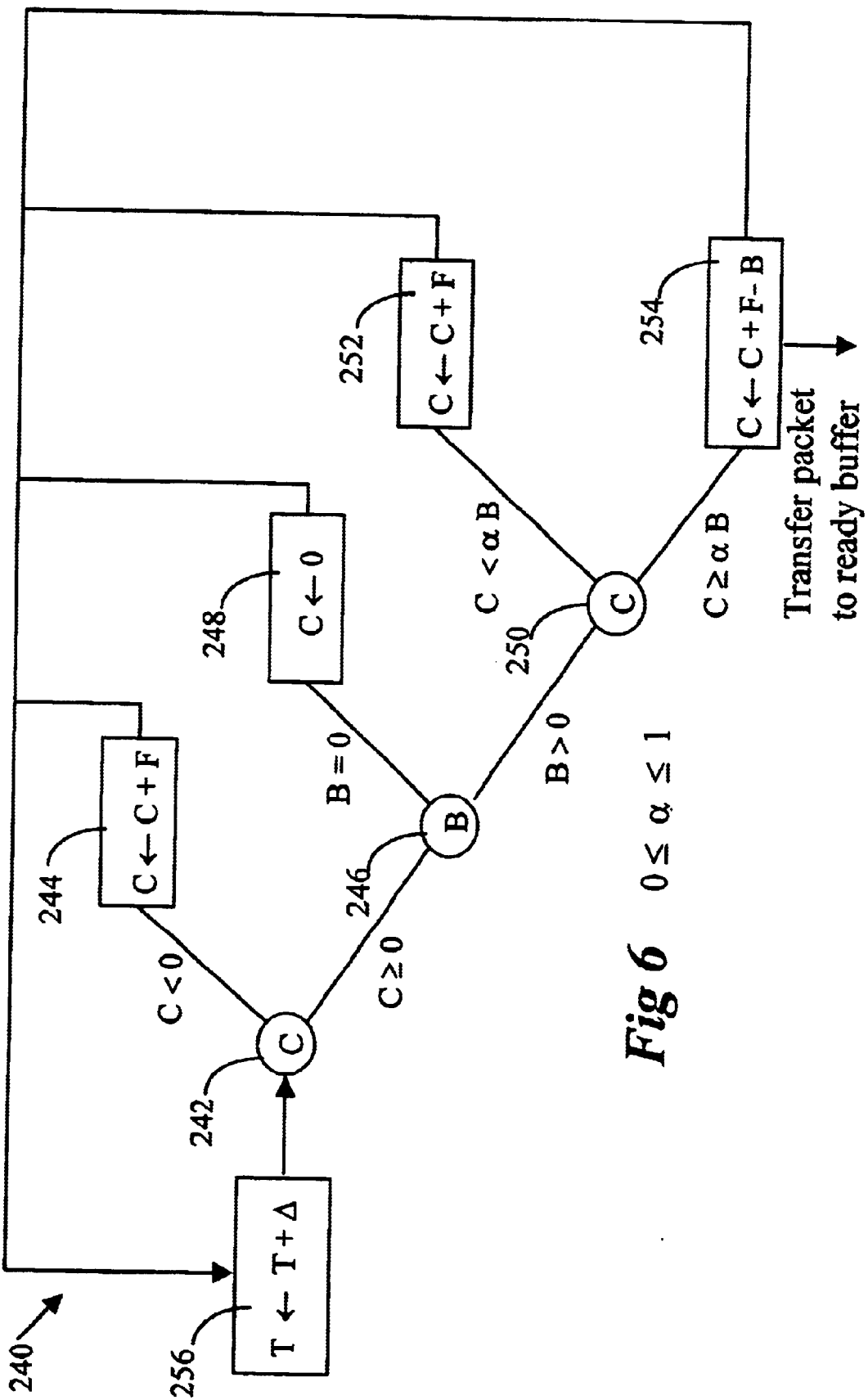
Fig 6  $0 \leq \alpha \leq 1$

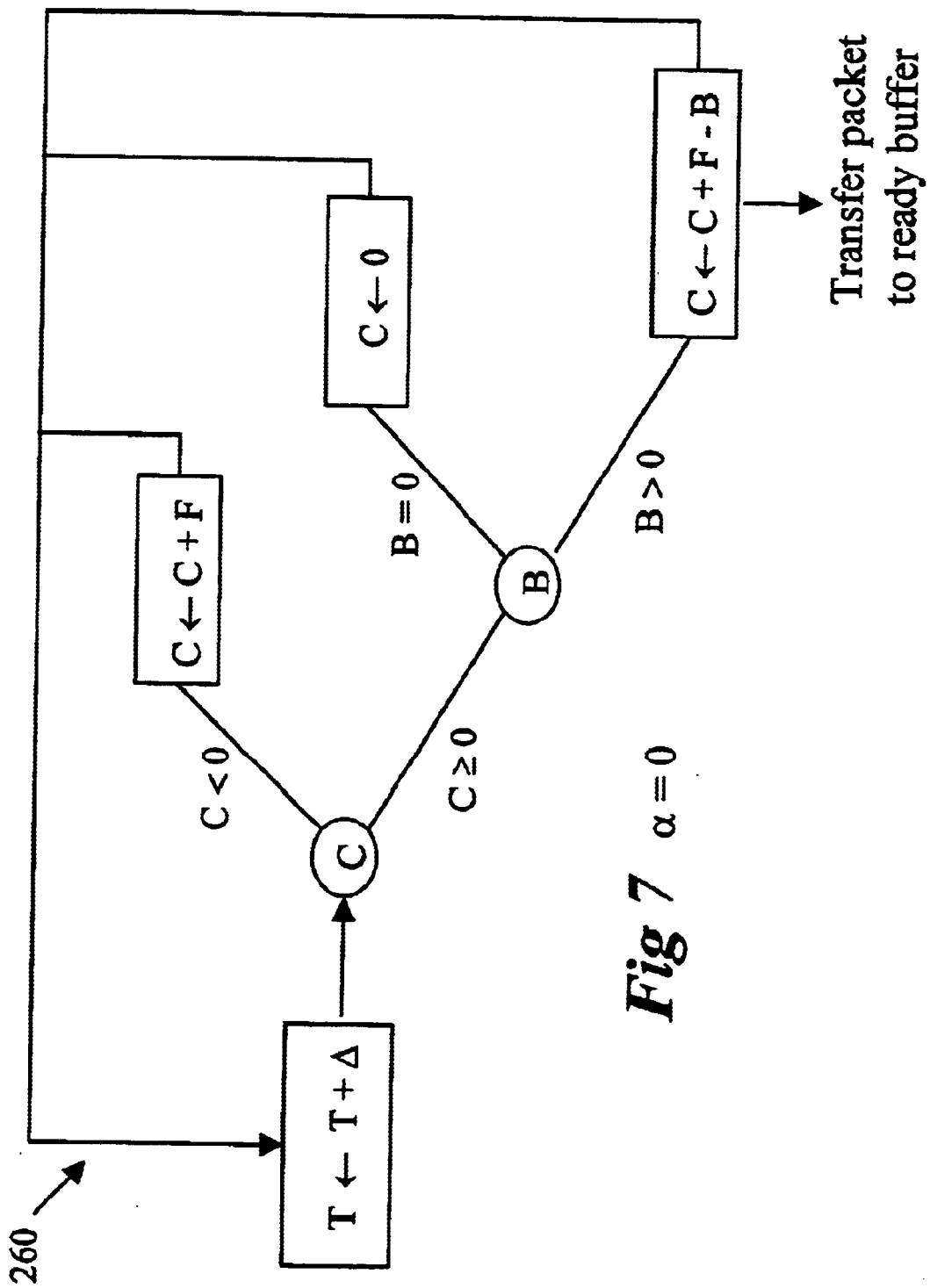
Fig 7 α = 0

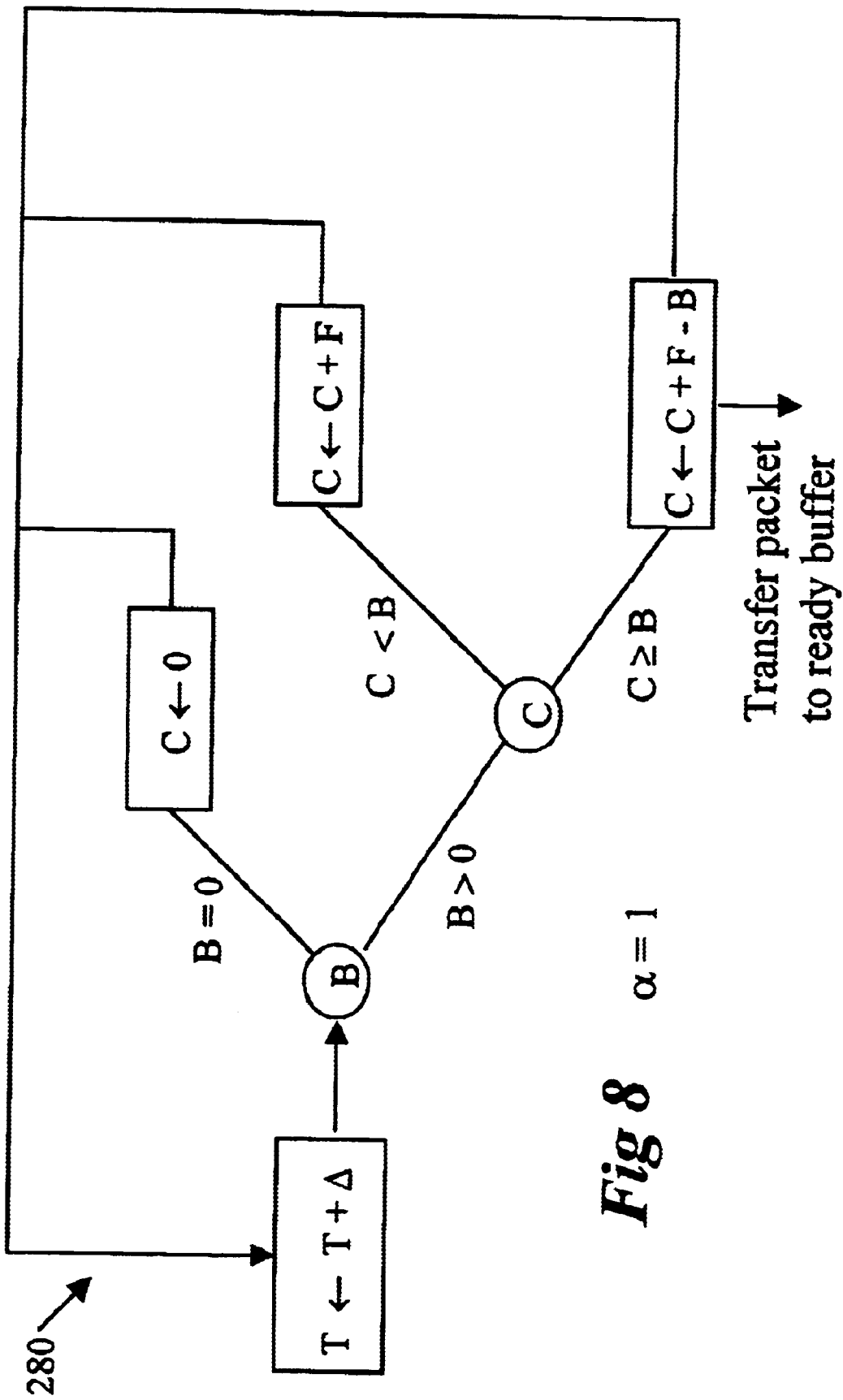
Fig 8   α = 1

M: maximum number of slots per hop

| B×Δ | C | X | m | C |
|---|---|---|---|---|
| 78.15 | 0 | 78.15 | 79 | .85 |
| 32.79 | .85 | 31.94 | 32 | 0.06 |
| 96.12 | 0.06 | 96.06 | 97 | .94 |
| 115.12 | 0.94 | 114.18 | 100 | -14.18 |
| (76.12) | -14.18 | — | 15 | 0.82 |
| 76.12 | 0.82 | 75.30 | 76 | 0.70 |

*Fig 14*  M = 100

| B×Δ | C | X | m | C |
|---|---|---|---|---|
| 124.84 | 0 | 124.84 | 100 | -24.84 |
|  | -24.84 |  | 25 | 0.16 |
| 237.96 | 0.16 | 237.80 | 100 | -137.80 |
|  | -137.80 |  | 100 | -37.80 |
| (186.72) | -37.80 |  | 38 | 0.20 |
|  | 0.20 | 186.52 | 100 | -86.52 |
|  | -86.52 |  | 87 | 0.48 |

SCHEDULING OF VARIABLE SIZED PACKET DATA UNDER TRANSFER RATE CONTROL

FIELD OF THE INVENTION

The present invention relates generally to the field of transfer rate control of multi-class packetized data. In particular, it is directed to methods of and apparatus for controlling and scheduling a large number of classes of data streams of variable sized packets sharing a high speed channel.

BACKGROUND OF INVENTION

This work is funded in part by the U.S. Government under Technology Investment Agreement, TIA F30602-98-2-0194.

Transfer rate control of data streams in a data network is needed for service quality control. It is also needed for realizing dynamic virtual networks where a high capacity, wide coverage network is divided into a number of virtual networks generally of different coverage and capacity. A data stream (or a class of data stream) is defined by (1) spatial attributes such as the source and sink nodes of a stream, (2) the grade-of-service attributes, such as blocking a connection request or delay of acceptance, and (3) quality-of-service attributes, such as packet delay or loss.

The use of rate control in data networks was accentuated with the emergence of ATM technology. In ATM, the cell size is constant. The fixed size of cells somewhat simplifies the control of data transfer rates. Several methods have been proposed for ATM rate control. For example, in U.S. Pat. Nos. 5,905,730 May 18, 1999 Yang et al and 5,926,459 July 20, 1999 Lyles et al.

U.S. Pat. No. 5,905,730 described a high speed packet scheduler which provides a high degree of fairness in scheduling packets associated with different sessions. An arriving packet is assigned a virtual start time and then a virtual finish time is calculated using its transfer time, length and other parameter. The packet with the smallest virtual finish time is then scheduled to transfer. U.S. Pat. No. 5,926,459, on the other hand, describes a traffic shaper in a packet switched communications system. The shaper includes a queueing mechanism and a scheduling mechanism. The scheduling mechanism comprises separate queues for packets with different priorities and a queue control mechanism for monitoring emission from the queues and for selectively de-scheduling packets on the queues.

PCT patent application WO98/46037 published on Oct. 15, 1998 has the present inventor as a co-inventor and described in detail the service rate regulator for ATM streams. It describes among other things the serial time domain rate control in which the controller tracks the required sampling instances of the data streams by using a time-space map. The concept of null class in the ATM environment is also described therein, in that a null class is created to use unassigned channel capacity.

More recently, the Internet, which transfers pacektized data of differing sizes, has gained widespread popularity. The Internet uses the Internet Protocol (IP) which relates to variable-size data. Presently, the Internet does not provide quality-of-service (QOS) control, and any enhancement of the IP that aims at providing QOS control is likely to require some form of transfer rate control of variable-size packets.

In a ATM, the transfer rate control is based on controlling the rate of transfer of cells of fixed sizes. In IP, such control must be based on controlling the bit rate not the packet rate, since the packets are generally of different sizes. Achieving precise rate control of variable-size packets is more intricate than realizing precise rate control of fixed size packets. It is more difficult to track data transfer rates of multiple data streams of variable packet sizes.

The packet scheduling problem may be summarized as follows:

Transfer rate regulation is a post admission problem. A number of data streams, each stream containing a number of connections, share a common channel. Each data stream has a specified data transfer rate such that the sum of the specified data transfer rates of all the data streams does not exceed the capacity of the shared channel. The rate allocations of a connection in a data stream may be based on user specifications or on traffic measurements at network ingress. A node is required to determine the best timing (schedule) of transmission of the packets of each data stream it receives from traffic sources so that the spacing of the packets of each stream conforms to the specified sampling interval of the stream. The sampling interval for transfer is inversely proportional to the specified transfer rate of the stream. This requirement must be satisfied for all the data streams that share the same channel. Furthermore, the packet sizes are generally unequal.

The present invention therefore aims at providing a method of and apparatus for controlling transfer rates or scheduling the service time of a large number of data streams of variable-sized packets sharing a high speed channel. The invention uses an expanded calendar for scheduling the service times of multiple data streams. The expanded calendar consists of an expanded time-space map, where a time slot in the map is associated with a stream identifier. A designated data stream is indicated by its stream identifier. The calendar (timespace map) is expanded by a predetermined expansion factor. The calendar expansion is a technique in which the number of time slots in the calendar is increased to exceed the maximum number of events recorded in the calendar at any time. This implies faster scanning of the calendar. The purpose of the expansion is to reduce a calendar's spatial congestion which may occur when the time slots become so occupied that scheduling subsequent events require extensive search and results in scheduling delay jitter.

SUMMARY OF INVENTION

Briefly stated, in accordance with one aspect, the invention is directed to a data structure for transfer rate control of K data streams into a shared channel, wherein the data streams contain variable-sized packets and K is a positive integer greater than unity. The data structure comprises an array of K pointers pointing to K packet buffers, each of which packet buffers is to hold the packets of respective data streams, and a calendar having a J-times expanded time-space map organized in L calendar slots holding either a data stream identifier or a vacant entry, J and L being positive integers greater than 1. The structure further includes a search array having one-to-one correspondence to the calendar slots for searching the calendar for eligible data streams for transfer and a control data table having K records, each record for each data stream having following fields; a scaling factor F, a nominal sampling interval $\Delta$ expressed in the number of calendar slots, a credit C in arbitrary units, a normalized length B of the packet of the data stream at the head of its packet buffer, and a next service time slot T of the calendar.

In accordance with another aspect, the invention is directed to an apparatus for transfer rate control of K data streams into a shared channel wherein the data streams contain variable sized packets and are stored in K packet buffers, K being a positive integer. The device comprises a pointer memory storing K pointers to the K packet buffers; a memory A containing an expanded time-space map for storing identifiers of data streams eligible for transfer in an array of calendar slots, a memory B having one-to-one correspondence with the memory A for locating a vacant calendar slot and a control data memory C holding specification of the data streams. The device further includes a search control circuit for locating a vacant slot indicator in memory B and a transfer control circuit for determining transfer eligibility of each data stream based on the specification contained in the control data memory C and enabling the transfer of the packet of one of K packet buffers to the ready queue memory D In accordance with yet a further aspect, the invention is directed to a method of scheduling transfer of a plurality of data streams from a plurality of packet buffers to a shared channel by accessing calendar slots of a calendar wherein each data stream has packets of variable sizes and the calendar has an expanded time-space map forming the calendar slots for tracking service time of each data stream for eligibility for transfer. The method comprises steps of at each access of a calendar slot, when a data stream identifier is read from memory A, (a) accumulating for each data stream a precalculated transfer credit; (b) ascertaining a packet size of each data stream; (c) declaring a data stream eligible for transfer if an accumulated transfer credit exceeds a predefined fraction of the packet size; and (d) retaining credit remainder in excess of the packet size.

In accordance with a further aspect, the invention is directed to a method of scheduling the transfer of data streams having packets of variable sizes from a plurality of K packet buffers to a shared channel using an expanded calendar wherein a waiting packet from a packet buffer is transferred immediately to a ready queue at the calendar service time slot at which the data stream identity is read, and a future service time slot at which the data stream is eligible for subsequent packet transfer is determined by a calendar hop defined by the lesser of a hop threshold and the product of the normalized packet size and the respective nominal sampling interval. The method includes the following steps; (a) incur a penalty for the respective traffic stream equal to said product; (b) execute an intermediate hop determined by the lesser of the magnitude of the penalty and the hop threshold; (c) accrue a hop credit in each intermediate hop proportional to the number of the calendar slots in the hop; (d) reduce the penalty by the hop credit; (e) repeat steps (b), (c), and (d) until the penalty is offset, and (f) retaining a credit fraction resulting from step (d).

In accordance with another aspect, the invention is directed to a method of scheduling transfer of a plurality of rate-regulated and unregulated data streams from a plurality of packet buffers to a shared channel by accessing calendar slots of a calendar, wherein each data stream has packets of variable sizes and the calendar has an expanded time-space map forming the calendar slots for tracking service time of each data stream for eligibility for transfer. The method comprises steps of, at each access of a calendar slot, assigning K classes to K rate-regulated data streams; assigning a null class to the unregulated data streams, and allocating a transfer rate equal to the difference between the channel capacity R and the sum of the allocated transfer rates of the K classes.

BRIEF DESCRIPTION OF DRAWINGS

FIG. 1 shows a control-data table according to an embodiment of the invention.

FIG. 2 shows a time-space map memory and a search memory.

FIG. 3 shows in a tabular form the criteria for service eligibility according to an embodiment with a parameter $\alpha$ ranging from 0 to 1.0.

FIG. 4 shows a simplified version of FIG. 3, with $\alpha$ set equal to zero.

FIG. 5 shows a simplified version of FIG. 3, with $\alpha$ set equal to one.

FIG. 6 shows a procedure for scheduling a packet according to the embodiment with the parameter or ranging from 0 to 1.0.

FIG. 7 shows a simplified scheduling procedure according to the embodiment with $\alpha=0$.

FIG. 8 shows a simplified scheduling procedure according to the embodiment with $\alpha=1$.

FIG. 14 illustrates changes in values of some parameters for a succession of packets according to the further embodiment.

FIG. 15 illustrates changes in values of some parameters for a succession of packets all exceeding a hop threshold according to the further embodiment.

FIG. 17 illustrates a parallel implementation of load-distribution scheduling processes.

DETAILED DESCRIPTION OF PREFERRED EMBODIMENTS OF INVENTION

Figure 9:
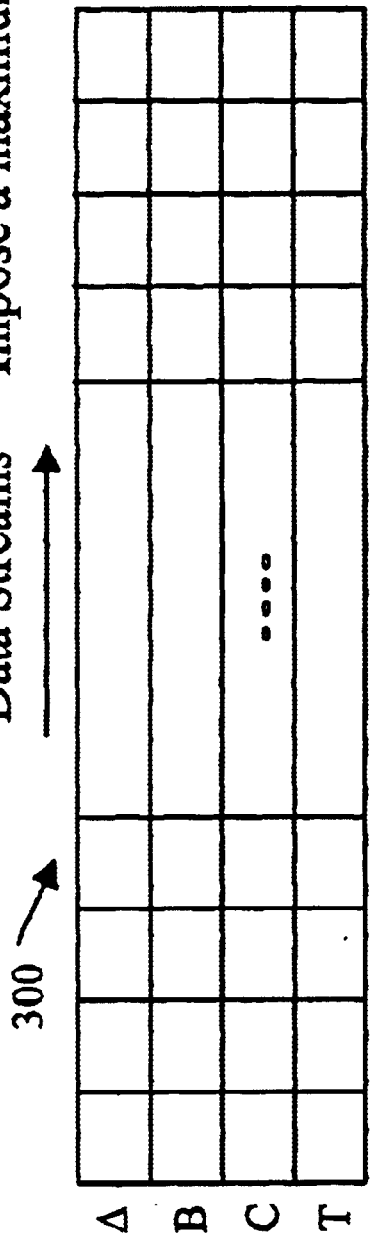
FIG. 9 is a control-data table according to a further embodiment.

The traffic offered to a shared channel of a known capacity, R, is divided into several data streams (or several classes of data streams), each identified by destination and service requirements. The number of data streams (or classes), K, may vary from two to several thousands. A service rate is allocated to each data stream. The service rate of each data stream is regulated using a rate regulator. The data in a data stream is organized in packets of variable sizes. In the description that follows, the terms, (transfer or service) rate regulation and rate control are used synonymously.

A calendar with a time-space map is used to track the service time of each data stream. The service times (times at which a data stream may be allowed to gain access to the shared channel through a ready queue) are selected by scanning the calendar so that each data stream can transmit packets of its data at a rate that equals (or exceeds) the rate prescribed for the data stream. By exceeding a specified rate, a stream may exploit time intervals allocated to other data streams but unused by the respective streams. The extent to which the unused time slots of a stream can be exploited by other stream is a matter of network-management policy.

In a cell-based application, a null class may be granted any unused cell time so that the transfer rate allocated to the null class can be exploited by unregulated traffic. With variable size packets, granting access to a packet belonging to a null class must take into account the size of the packet, as will be described below.

Definition of Terms

Rate regulation vs. packet scheduling: Rate regulation and packet scheduling are two sides of the same coin. Rate (service rate or transfer rate) regulation ensures that the mean transfer rate of a class or a data stream corresponds to the admission agreement and that the packet spacing in the time domain tracks the packets' arrival times as faithfully as possible. Packet scheduling is the process of selecting the packet transfer instants in order to satisfy the above requirements.

Channel capacity, R: The channel capacity R is the maximum rate at which data can be transmitted through the channel, generally expressed in bits per second.

Packet size or length, b: The packet size b is expressed as the numbers of bytes in a packet.

Transfer (or service) rate, r: The transfer rate r is the allowed rate at which the stream's data is transmitted through the shared channel, in bit per second.

Null class: In some embodiments, a null class can be created to exploit unassigned channel capacity. The transfer rate allocated to the null class can be exploited by unregulated traffic.

Transfer time slot: The transfer slot is the time taken to transmit a nominal data unit u through the shared channel.

Nominal data unit, u: The nominal data unit u is a reference packet size selected so that its value is exceeded by a large proportion of packets of data streams.

Normalized packet size, B: The normalized packet size B is the ratio of the packet length b to the length u of the nominal data unit. For example, if the nominal data unit is 128 bytes, a packet of 1000 bytes would have a normalized packet size of 7.8125.

Scheduler capacity: The capacity of a packet scheduler is defined as the maximum number of data streams (classes) that can be controlled by the scheduler.

Scheduler speed: The speed of a packet scheduler is defined as the maximum packet rate that can be scheduled. The scheduler speed is determined primarily by the speed of the control circuitry and speed of memory access.

Calendar: an array of L memory slots, each slot corresponding to an arbitrarily defined time unit, the position of a slot is indicative of a cyclic scanning time, the cycle duration being defined by the number of memory slots L. The time-space map is one implementation of a calendar.

Calendar slot: a slot in a calendar in which an identifier of a data stream is recorded. Calendar slots wrap-around by finite word length. The duration of a calendar slot is less than or equal to a transfer time slot.

Calendar length, L: The number L of memory slots in a calendar is selected to satisfy the requirement of the slowest data stream. The number L dictates the maximum spacing between two successive calendar entries that belong to the same data stream. Thus, if the spacing between two successive entries exceeds the calendar length, the spacing must artificially be divided into spans and each span must not exceed the calendar length.

Calendar expansion factor, J: The calendar expansion factor J is the number of calendar slots corresponding to a transfer time slot. The expansion factor J is preferably an integer in the form $2^j$, j being a positive integer. Generally, a value of J=2 is sufficient. When J=2, there are two calendar slots to one transfer time slot.

Calendar scanning cycle: The number, (L/J), of transfer time slots are scanned in one calendar scanning cycle. L and J are preferably integer powers of 2.

Calendar hop: A calendar hop is defined according to each data stream as the number of calendar slots between successive entries of the specific data stream in the calendar.

Nominal sampling interval Δ: A nominal sampling interval is a calendar hop if a packet length equals a nominal data unit u.

Hop threshold, M: The hop threshold M is the maximum permissible number of calendar slots per hop. The value of M is selected so as to avoid calendar wrap-around.

Calendar occupancy θ: Calendar occupancy θ is the proportion of occupied calendar slots, i.e., the number of occupied slots divided by the total number of calendar slots.

Calendar spatial congestion: Calendar spatial congestion is the incidence of encountering a large number of successive reserved (occupied) calendar slots.

Scaling Factor, F: F is an integer of the form $2^k$, k being a non-negative integer. The scaling factor is a parameter to control the hop length and the amount of credit that each data stream will earn at each hop. The use of a scaling factor greater than one is desirable for a traffic stream that has long packets, with the lowest packet size being significantly greater than the nominal data unit. The scaling factor F for a stream is selected to be comparable to the lowest normalized packet size of a stream. The value of F should, however, be limited to avoid obtaining a very large value of Δ that, in turn, may result in an erroneous wrap-around.

Timing overlap: Timing overlap refers to an erroueous skipping of one or more calendar scanning cycles when reserving a future slot in the calendar. It arises if a calendar hop exceeds a calendar length and it can be virtually eliminated (with a target probability of occurrence reduced to an infinitesimal $10^{-50}$ or less) with a modest increase in calendar length.

Search effort, E: The search effort, E, is expressed as the mean number of calendar slots examined to find a free slot. E is expressed as E=1/(1-θ) under the assumption of random slot occupancy distribution. A free calendar slot may be found immediately, or after scanning a number of slots. The slot occupancy distribution may not be random—there is a correlation between the occupancy states of successive calendar slots. However, a calculation based on randomness gives a reasonable order of magnitude of the required search effort.

In accordance with an embodiment of the invention, the method of rate control is performed by using an expanded calendar consisting of an expanded time-space map, in which the time of serving a designated data stream is indicated in the calendar slot (time slot or service slot) by entering the stream's identifier (identification number). The calendar is expanded by an integer expansion factor J of larger than unity to reduce a calendar's spatial congestion. An expansion factor J of 2, for example, should be sufficient and it would result in reducing the spatial congestion to an insignificant level.

The sampling interval of a data stream, expressed in units of transfer time slot, is proportional to the ratio of the channel capacity R and the required service rate, r, of the data stream. The sampling intervals of the K number of streams (or classes) may vary significantly. The number of calendar slots, L, is selected so as to satisfy the requirement of the slowest stream since the slower the data stream, the larger the sampling interval. The sampling interval Δ, expressed in the number of calendar slots instead of transfer time slots, of a data stream of a specified service rate, r, is J×R/r, where R and r are in bits per second and f is the expansion factor.

A spatial congestion allowance must also be added to the largest sampling interval to determine the required calendar length. The spatial congestion allowance should be about two orders of magnitude higher than the mean search effort E. The latter, E, depends on the calendar occupancy θ which represents the number of occupied (reserved) calendar slots divided by the total number of calendar slots; E=1/(1-θ) with random slot occupancy distribution. While this calculation is based on a simplified assumption of random separation of vacant slots, i.e., uncorrelated occupancy of successive calendar slots, it provides a reasonable estimate of search effort. Without expansion (J=1), the calendar slot is equal to the transfer time slot and the calendar occupancy, θ, may be as high as 0.99. In such a case, the mean search effort E is 100. To avoid timing overlap, where a sampling interval Δ exceeds the calendar length L, the spatial congestion allowance should be about 50 times the mean search effort, leading to an allowance of 5000 calendar slots. If J=2 (two calendar slots per transfer slot), the mean calendar occupancy θ would be less than 0.5, and the mean search effort is 2.0. An allowance of 100 slots is then more than sufficient. In any case, it is preferably to provide a larger spatial congestion allowance than needed since the added complexity, of any, is minimal.

The rate control method of this embodiment requires the use of four memories:

(1) A time-space memory, memory A, having L entries, L being the calendar length expressed as the number of calendar slots. Each J slots in memory A correspond to a transfer time slot. Selecting a nominal data unit of 1024 (=$2^{10}$) bits, and using shared channel of 10 Gb/s capacity, the duration of a calendar slot (without expansion) would be about 100 nsec. Each entry in memory A contains an identifier of a data stream.

(2) A search memory, memory B, that is only 1 bit wide, having L entries. There is a one-to-one correspondence between the entries in memory A and memory B. An entry in memory B is set to "1" if a corresponding entry in memory A is occupied, and set to "0" otherwise. The purpose of memory B is to allow reading the calendar and searching for a free calendar slots simultaneously. Reading the calendar yields a stream identifier, searching yields a free calendar slot in which to insert a data stream identifier. This increases the scheduling speed. Once the content of a calendar slot is read from memory A, the corresponding entry in search map B is changed from 1 to 0, to indicate than the slot is now free for future scheduling.

(3) A control data memory, memory C, that contains a table of K entries (columns), K being the maximum number of data streams. Each entry corresponds to a data stream and comprises five fields: (a) a scale factor F, (b) required sampling interval Δ per nominal data unit, Δ being expressed as a number of calendar slots, (c) normalized packet length B, (d) a credit C required to control the flow rate, and (e) reference calendar slot T indicating the ideal calendar slot for serving the respective data stream. The variables Δ, B, and C are generally real numbers.

(4) A ready queue memory, memory D, which holds the identification of data streams that have been declared ready (or eligible) to egress.

Referring to the accompanying drawings, FIG. 1 shows a control data table, stored in memory C, to be used for implementing the fixed spacing technique according to one embodiment of the invention. The normalized packet size B is determined from the head packet of a data stream. The credit C is initialized as zero. The initial slot T may be initialized as the calendar slot of arrival of the first packet of the data stream, immediately after the data stream has been admitted. This could be known from a global time counter of the same period as the calendar cycle. Control table 100 therefore has 5 rows and a number of columns, K, K being equal to the maximum number of rate-regulated data streams. Row 102 stores a scaling factor F for each data stream; the factor F varies according to the data stream. As will be described elsewhere, F can be set to 1 for all the data streams in which case, row 102 is not needed. Row 104 stores the nominal service interval Δ for each stream. The nominal sampling interval Δ for a stream is determined as Δ=J×FR/r, R being the channel capacity, F the scaling factor, J the expansion factor, and r the allocated service rate for the stream. J is an integer in the form $2^j$ and F is an integer of the form $2^k$, j and k being positive integers, so that computing Δ involves mainly one division operation and bit-shifting. Row 106 stores the normalized length B of the head packet of each data stream stored in its data (packet) buffer. B is set to zero for any data stream with an empty data buffer. Row 108 stores the accumulated credit C for each data stream. Each data stream earns a credit of F units for each service interval Δ. A data stream is served based on the corresponding entries B and C in rows 106 and 108. Row 110 stores the target next service time for a data stream, which is the next time slot in which the data stream identifier should be written. F and Δ are updated at time of adding a new data stream or modifying the capacity requirements of the data stream.

FIG. 2 depicts a calendar 122 and a search memory 124 (stored in memory A and memory B respectively). Each of the two memories has L calendar (service) slots 126 and 128. Memory A holds identifiers of data streams which have been schedules into specific calendar slots. Memory B is a 1-bit-wide flag, for example, and holds indication of occupancy or vacancy state of the respective calendar slot. The calendar is used to schedule consecutive tentative service slots, for each data stream, at which a data stream earns a credit F, according to this embodiment. A packet size is generally different from the normalized data unit. The calendar is scanned to read the identifier of a data stream at a tentative service slot as indicated by X and designated by 132. The control data table 100 (FIG. 1) is read at an index equal to the read stream identifier to determine the credit C of the stream. The data stream will be served at the tentative service slot (or calendar slot) if it has a sufficient credit C that corresponds to a predefined fraction α, $0 \leq \alpha \leq 1$, of the size B of its waiting packet. When it is determined that a data stream is eligible for transfer to the ready queue, the data-stream identifier is entered in the ready queue where it waits for its turn for actual transfer. Meanwhile, when the identifier is transferred out to the ready queue, the next sampling interval T and the credit C for the data stream are calculated and other parameters of the control data table are updated accordingly. The calculated next sampling interval is then entered to the calendar by hopping the required calendar slots as indicated by 136 in FIG. 2. With a proper expansion and scaling factors, the calendar occupancy is relatively low so that a free calendar slot can be found in the vicinity of the desired service slot.

As mentioned earlier, the normalized packet size B is determined by dividing the actual packet length b of the waiting head packet of a data stream by the nominal data unit u. The value of u is preferably chosen to be an integer power of 2 so that the division operation, B=b/u, is performed by a bit-shift operation. Using u=1024, for example, the value of B is the 10 bit right-shifted word representing the actual length b. The filed B is dynamically changed according to the respective waiting packet. The C field in the data control table 100 is updated dynamically as will be explained below. The T field, indicating the next reference calendar slot for the respective stream is determined by increasing its current value by $\Delta$. It is important to not that the successive values of T are determined by accumulating the respective $\Delta$ and not by the actual service time of a stream.

A nominal data unit u, of 1 kilo bits, for example, is used to define a transfer time slot. With a channel capacity R of 10 G/s, a nominal data unit of 1 kilo bits requires about 100 nsec to transfer (i.e., the transfer time slot, as defined earlier, has a duration of 100 nanoseconds). A calendar slit is shorter than a transfer time slot by the ratio of the expansion factor J. With J=2, a calendar slot in the above example has a duration of about 50 nsec. If the minimum controllable transfer rate is 0.0001 of the channel capacity, and with J=2, the calendar length L should be at least 20000 slots. Using a size L of 32 K slots would render timing overlap virtually impossible.

The number of calendar slots per nominal data unit between successive slots for a data stream having a prescribed transfer rate of r is the sampling interval of the nominal data unit. The actual separation between successive slots in the calendar for a data stream is therefore scaled by its normalized packet size B. The mean packet size may differ significantly from one data stream to another. In order to reduce both the calendar spatial congestion and the search effort, the nominal spacing (sampling interval of the nominal data unit) for a stream can be multiplied by its scaling factor F, and the respective stream is then credited by the value F units in each visit. Increasing F reduces the search effort by reducing $\theta$, however, a reduction in the search effort is inconsequential since the scheduler must be designed for F=1 anyway. The use of the scaling factor F is optional. The main advantage of using a scaling factor F greater than the unity is to reduce the calendar occupancy and hence reduce the scheduling jitter. The scheduling jitter is the deviation of the actual time of transferring a packet to the common channel from the specified transfer times. With F-2 and J-2, $\theta$ is expected to be less than 0.25. With $\theta$-0.25, for example, the mean search effort E reduces to 1.25, rendering the scheduling jitter negligible and, even with a modest spatial congestion allowance, the probability of erroneous wrap-around reduces to virtually zero. The scaling factor F should be less than or equal to the ratio of the minimum packet size of a data stream to the nominal data unit. Thus, if a ratio of a minimum packet size to a nominal data unit is 2.7, for example, the appropriate value of F would be 2. The minimum packet size of a data stream is predefined. The value of the positive integer F is preferably an integer power of 2, preferably adopting a value of 1, 2, or 4. The use of higher values would necessitate the use of a larger calendar, otherwise the sampling interval $\Delta$ may exceed the calendar length resulting in erroneous timing overlap.

In this embodiment, the calendar is visited each $\Delta$ slots, for a given data stream. In each visit, the stream is credited by a respective value of F units and the packet may be transferred to a ready queue if its corresponding credits satisfy the adopted service policy, which will be described below. The maximum value of T is the calendar length L.

Thus, when T exceeds L, it is automatically reduced to (T-L). If L is selected to be $2^{16}$, for example, the variable T would be represented by a 20-bit word, with the most significant 16 bits representing the integer part which is used for indexing the calendar. Note that it is preferable to represent the other real variables ($\Delta$ and C) by the same word length of T. For each stream, the real variable T which indicates the calendar slot at which a stream is to be considered for transfer to the ready queue is determined by successive addition of the stream's calendar hop length $\Delta$, which is also a real number. While the value of T is updated as a real number, in order to preserve accuracy, its integer value is actually used as the reference calendar slot at which the search for a free calendar slot begins. The stream's identifier is written in memory. A at the reference calendar slot or, if the reference calendar slot is occupied, at the nearest free calendar slot.

FIG. 3 shows a table 200 which explains how the service eligibility is determined for a given data stream, based on the parameters B and C of control table 100 of FIG. 1. The decision is based on the comparison between the available (accumulated) credit C and a fraction $\alpha$ of the normalized packet length B. The fraction $\alpha$ is a design parameter and is $0 \leq \alpha \leq 1$. If $\alpha$ is a chosen to be zero, a waiting packet is eligible for immediate service if the data stream has non-negative credit. Thus, the waiting packet would be served once its respective stream identifier is encountered during the scanning of the time-space calendar 120. If $\alpha=1$, a waiting packet can only be served if its data stream accumulates a credit C that equals or exceeds the normalized length of the waiting packet. For a value of $\alpha$ between 0 and 1, a packet is served when the credit of its data stream equals or exceeds a fraction $\alpha$ of the normalized size of the waiting packet, as shown at 208 in FIG. 3, otherwise the packet is not served but the data stream accumulates a credit of a respective F units at 206. The value of $\alpha$ affects the packet scheduling jitter. Intermediate values of $\alpha$, between 0 and 1, are preferably selected as negative powers of 2 so that the multiplication by $\alpha$ reduces to a simple bit-shift operation. Preferably values of $\alpha$ are ½ and ¼.

FIGS. 4 and 5 illustrate cases where $\alpha$ is specifically set to 0 and 1, respectively.

Referring to FIG. 3, when a data stream identifier is encountered in the calendar and if the value of B is zero, i.e., there is no waiting packet, any positive credit of the stream is reduced to zero (C←0 at 204). This is required for stability of the scheduler, because if a data stream is dormant for an extended period, having no packet, and if the stream's credit is accumulated during its dormant period, the stream may accumulate enough credits to make it eligible to access the entire channel capacity, or a large fraction thereof, to the detriment of other data streams.

Au exception to the rule of setting C=0 when B-0 is allowed in the transition from a negative credit to a positive credit. If a stream has a negative credit and no waiting packets, its credit is increased by a respective scaling factor F. If the credit becomes positive after the addition of F, the stream can retain the positive credit until the following sampling instant (i.e., until the subsequent time slot at which the stream identifier is encountered in the calendar). Thus, if a data stream is idle (B=0) and its credit C is negative, it is granted a credit of F (C←C+F at 202) with each loop. When it reaches a positive credit and is still idle, it can retain the credit. When a data stream has a negative credit C, it can not send another packet as also described earlier. If $\alpha<1$, the credit can be negative. By selecting $\alpha$ to be zero, for example, the packet is transferred even though it may have an insufficient credit. In effect, with $\alpha=0$, the respective data stream borrows the needed credits, but is not allowed any further packet transfer until the credit becomes non-negative.

Once the packet is served, the data stream is debited by the length B of the packet (C←C+F−B as shown at 208). At each calendar hop, a credit of F units, as read from table 100, is added to the data stream encountered in memory A if the packet buffer of the data stream is not empty or its credit is negative as indicated at 202, 206 and 208 in FIG. 3. This is the credit to be earned until the next tentative service time.

When a decision is made to transfer a packet at calendar slot T, the packet is sent to a ready queue from which it is transferred to the network through the common channel. The ready queue is needed for two reasons:

(1) an expansion J>1 can result in as many as J packets being declared eligible for transfer within a transfer time slot that is insufficient to accommodate the eligible packets, and (2) the packets being of variable size, generally greater than or equal to the nominal data unit, can also overlap even if selected in successive calendar slots with J=1.

When a credit of F is added, and since the normalized packet size B is not necessarily an integer, it is possible that the credits exceed the normalized packet size at the calendar slot at which it is transferred to the ready queue. The remaining credit is retained in entry C of the control table. The remaining credit is a real number less than F.

FIG. 4 is derived from FIG. 3 by setting $\alpha$=0. The figure shows a table 210 indicating that a packet is served as long as the corresponding credit of its data stream is non-negative. Once the packet is served, the corresponding stream is debited by a respective (B−F) value shown at 212 as explained above.

FIG. 5 is derived from FIG. 3 by setting $\alpha$=1. The figure shows a table 220 indicating that a waiting packet is only served if the credit of its data stream is at least equal to B. When a packet is served, its stream is debited by (B−F) shown at 222.

FIG. 6 is a flow chart 240 showing the steps to be followed at each calendar hop for the general case of $0 \leq \alpha \leq 1$, for determining the eligibility of a data stream to be served at a tentative service time. Starting with the current value of C at comparison step 242, if C<0, the value of C is increased by F at 244, and the process continues to scan the calendar. If $C \geq 0$, the value of B is examined at comparison step 246. If B=0, indicating an idle data stream, the value of C is set equal to zero at 248, and scanning the calendar memory, Memory A, continues. If B>0, indicating a waiting packet, then the value of C is compared with a B at comparison step 250. If C<$\alpha$B, C is increased by F at 252 and the scanning process continues. Otherwise, the waiting packet is transferred to the ready queue and the value of C is modified by adding (F−B) at 254. Scanning memory A then proceeds.

In a calendar hop process at 256, the value of T is increased by a respective $\Delta$. The modified value of T is entered in the control data table at an entry corresponding to the data stream, and a free calendar slot, at or following an index equal to the integer part of the new value of T, is marked with the stream's identification number.

FIG. 7 is a special case 260 of FIG. 6 for the case of $\alpha$=0.

FIG. 8 is a special case 280 of FIG. 6 for $\alpha$=1.

Scheduling

The scheduling algorithm according to an embodiment is described in detail below.

The packets of up to K data streams are stored in K packet buffers (not shown in the accompanying figures). The transfer of packets to a shared channel is performed according to the following steps:

(a) registering the specification of each data stream in a control data table, memory C (FIG. 1), (b) selecting an initial address of each data stream in a J-expanded time-space map, memory A, (c) determining by scanning the search memory, memory B, if a read entry in the time-space map is a vacant entry or a data stream identifier, (d) reading the entries in J consecutive addresses (calendar slots) in the time-space map during each transfer time slot, (e) determining if a data stream is eligible for shared-channel access, (f) writing the identifier of an eligible data stream in a ready queue memory, memory D, and (g) updating respective fields of the data stream, including credit C, in the control data table.

The process of determining the eligibility of a data stream, the update of respective data stream specification, and the time-space map index requires selecting a parameter $\alpha$ between 0 and 1 and follows the algorithm:

If $C<0$, then $C \leftarrow C+F$, if $C \geq 0$ and $B=0$, then $C \leftarrow 0$, if $C \geq 0$ and $B>0$, then if $C<\alpha B$, $C \leftarrow C+F$, if $C \geq \alpha B$, $C \leftarrow C+F-B$, $T \leftarrow T|\Delta$.

This process is illustrated in FIGS. 3 and 6.

When $\alpha$=0, the above algorithm reduces to:

if $C>0$, then $C \leftarrow C+F$, if $C \geq 0$ and $B=0$, then $C \leftarrow 0$, if $C \geq 0$ and $B>0$, then $C \leftarrow C+F-B$, $T \leftarrow T+\Delta$.

This process is illustrated in FIGS. 4 and 7.

When $\alpha$=1, the algorithm becomes:

if $B=0$, then $C \leftarrow 0$, if $B>0$ and $C>B$, then $C \leftarrow C+F$, if $B>0$ and $C \geq B$, then $C \leftarrow C+F-B$, $T \leftarrow T+\Delta$.

A further embodiment

Instead of visiting the calendar at a fixed interval $\Delta$ for a given data stream, then determining its eligibility, or otherwise, as has thus been described, in a further embodiment the calendar spacing for a data stream is determined by the product B×$\Delta$ for packet transfer at each hop. Packet transfer-eligibility decisions are not based on the packet size or a fraction thereof. This corresponds to the case $\alpha$−0 of the earlier embodiment. In an analogy to the earlier embodiment, a fraction $\alpha$ of the normalized packet length B is chosen to be zero in that a waiting packet is eligible for immediate service if the data stream has non-negative credit. Thus, a packet would be transferred to the ready queue once its respective data stream identifier is encountered during the scanning of the calendar if the credit of its data stream is non-negative. A calendar reference slot at which the data stream is examined again is computed and the nearest free calendar slot following the computed reference slot is marked for the subsequent packet transfer from the respective data stream, as in the earlier embodiment. This approach significantly reduces the calendar occupancy when the packet sizes have high variance above the specified minimum, hence reducing scheduling jitter (and processing effort). The main drawback of this embodiment, however, is that a multiplication operation (B times $\Delta$) is needed with each packet transfer. The processing effort affects the scheduler's speed. An additional step is also required to ensure that the product B×$\Delta$ (which determined a spacing between two calendar slots for a data stream) should not exceed a specified maximum number of calendar slots in one hop (the calendar hop threshold M). The extra computational effort, however, is offset by the reduced frequency of performing the computation. According to this embodiment, the process of determining the eligibility of a stream and the number of hops, if it is determined that the stream is eligible for transfer to the ready queue, comprises the following steps:

If $C<0$: $m=\lceil -C \rceil$, if $m>M$, $m \leftarrow M$, $C \leftarrow C+m$;

If $C \geq 0$ and $B=0$: $m=\lceil \Delta \rceil$, $C \leftarrow 0$;

If $C \geq 0$ and $B>0$: $X=B \times \Delta - C$, $m=\lceil X \rceil$, if $m>M$, $m \leftarrow M$, $C \leftarrow m-X$;

where M is the calendar hop threshold selected to prevent timing overlap as described earlier. If C is negative, magnitude of C is rounded up to a positive number m. If C is positive and no packets are waiting (B=0), m is set equal to $\lceil \Delta \rceil$, where $\lceil,\lceil$ denotes rounding up. If C is positive and a packet is waiting, X is calculated and m is set to a round up value of X. The positive integer m is the hop length.

Figure 10:
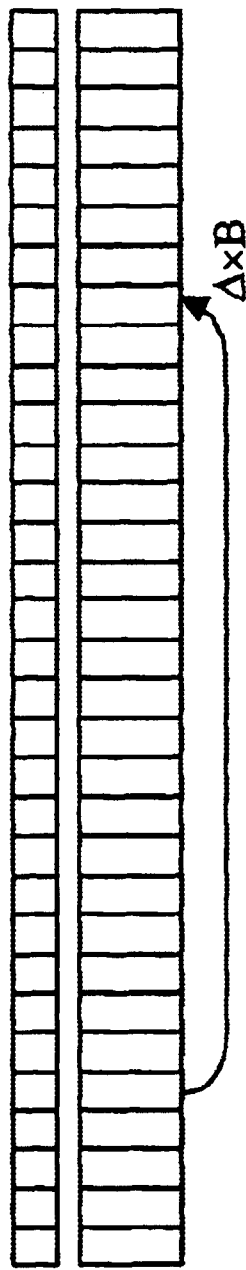
FIG. 10 illustrates the calendar hop selection in one case according to the further embodiment.
Figure 11:
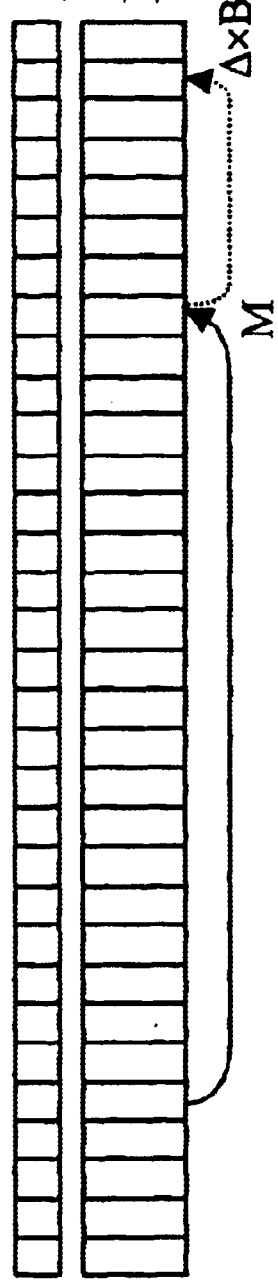
FIG. 11 illustrates the calendar hop selection in another case according to the further embodiment.

The control data table 300 used in the scheduling method according to this embodiment is shown in FIG. 9. It is similar to control data table 100 of the earlier embodiment shown in FIG. 1, except that the scaling factor F is not required (F is set to 1) and the variable T is an integer. FIGS. 10 and 11 illustrate the calendar hops according to this embodiment for two cases. The calendar slots and search memory arrangements are the same as those of FIGS. 2 and 3. In the first example of FIG. 10, the calendar hop span determined by B×$\Delta$ is found to be smaller than the hop threshold M and the packet transfer is effected with a single hop. In the second example of FIG. 11, the calendar hop exceeds the hop threshold and the packet transfer is effected in two hops, the first of which equals the hop threshold.

Figure 12:
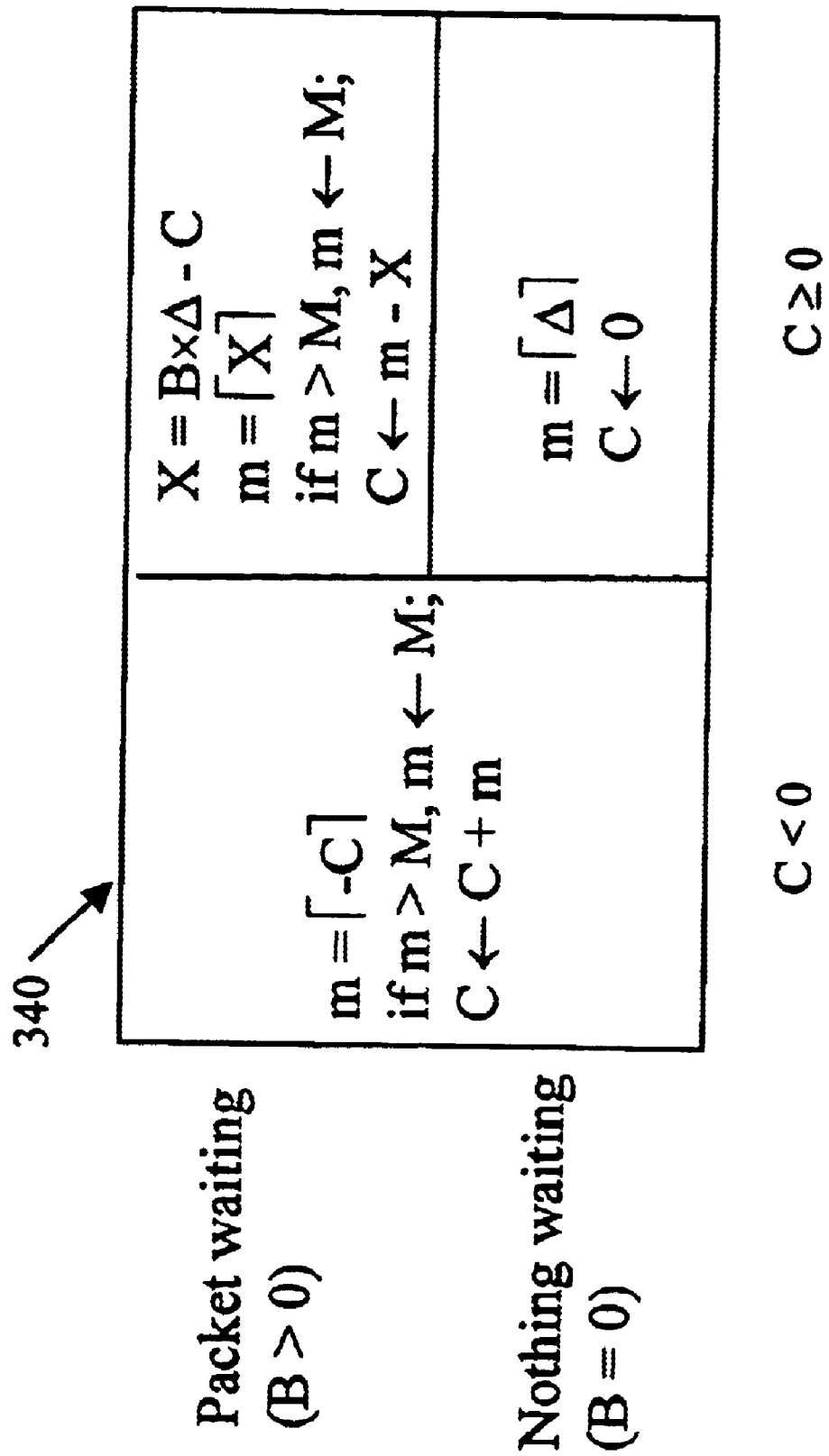
FIG. 12 shows in a tabular form the service eligibility criterion and relevant data updates of the control data table according to the further embodiment.
Figure 13:
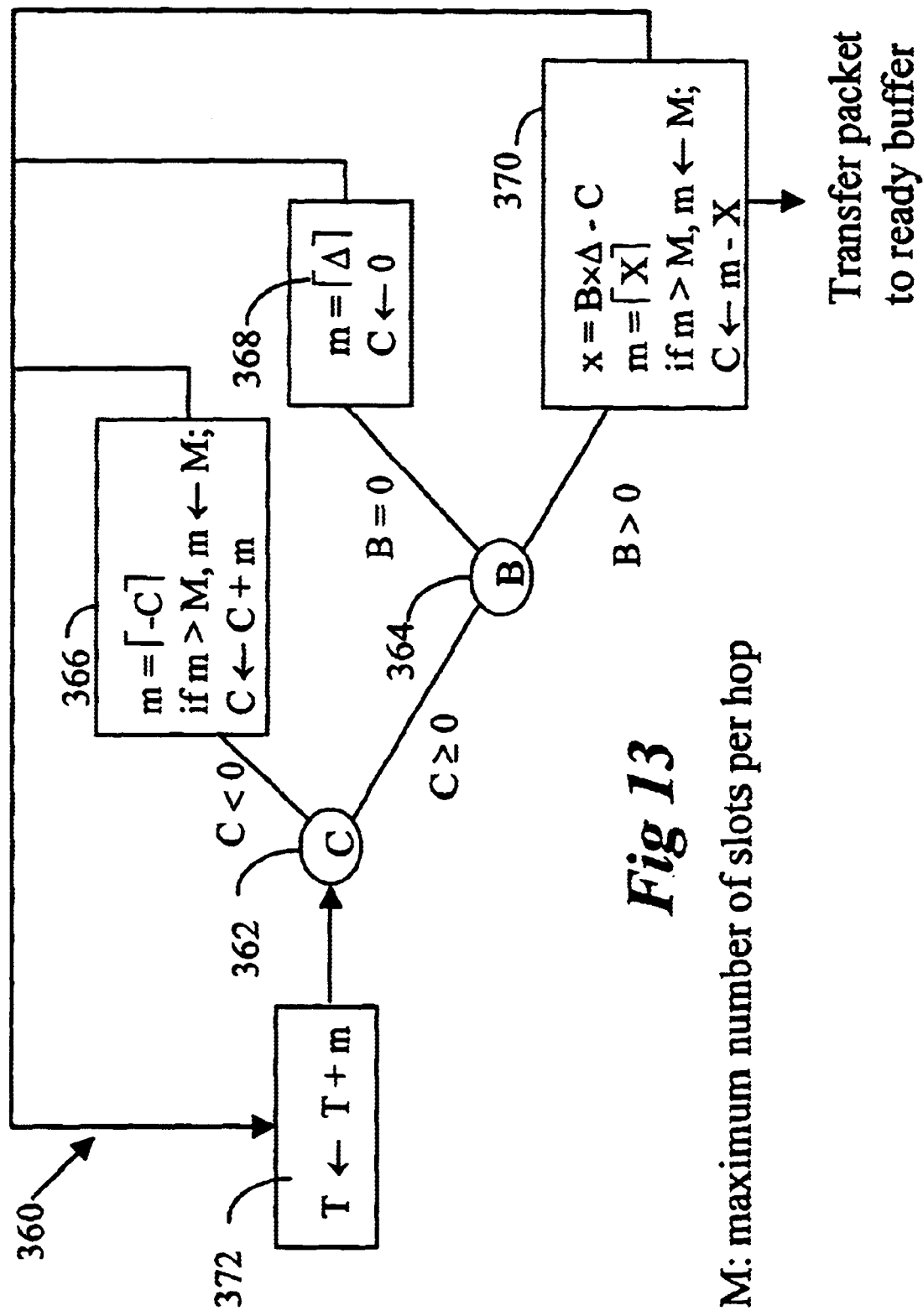
FIG. 13 illustrates the process of packet scheduling according to the further embodiments.

Like FIG. 3 of the earlier embodiment, FIG. 12 summarizes the conditions 340 of establishing the eligibility of a packet for transfer under this embodiment. FIG. 13 illustrates the algorithm 360 used for transferring a packet and updating the respective specification in control data table 300. Comparison stages 362 and 366 determine values of C and B and the calculations and updating of various parameters are performed at steps 366, 368 and 370. The next service time is then determined and entered at 372.

FIG. 14 illustrates the process of FIG. 13 for a number of packet arrivals to a given packet buffer of a data stream with one of the packets resulting in a large calendar hop the exceeds a hop threshold M (e.g., of 100) calendar slots. In the figure, a row corresponds to a hop. In the first row, C is 0, B×$\Delta$ for the packet at the head of the queue is calculated to be 78.15. X therefore is 78.15 and the round-up figure of X is m which is then 79 which is smaller than the hop threshold of 100. The transfer of the packet can proceed while the new credit will be m−X which is 0.85. The next hop (second row) starts with the credit of 0.85 and B×$\Delta$ of the waiting packet is 32.79. Similar calculations are performed and the new credit is generated to be 0.06. On the fourth row, a long packet is at the head and its B×$\Delta$ is 115.12. X is calculated to be 114.18 which results in m being 115 which is larger than M (M=100). Therefore, m is now 100 and after a transfer of the packet, the credit will be negative (−14.18). In the following hop, a packet with its B×$\Delta$ being 76.12 will not get transferred because the credit is negative but will earn a new credit of 0.82 (=−14.18+15).

FIG. 15 illustrates similar processes but involves a succession of long packets each resulting in long hops exceeding the threshold M. FIG. 15 illustrates the execution of the algorithm for seven consecutive hops. In the first hop, a packet waiting in the queue of a given stream has a B×$\Delta$ product of 124.24 while the specified hop threshold is 100 calendar slots. The credit remaining from previous processing is zero. A penalty of 124.24 (equal to B×$\Delta$) is applied to the stream, resulting in a credit of −124.24. An intermediate hop of 100 (the lesser of 100 and 124.24) is executed and a hop credit of 100 reduces the stream's penalty to −24.24. Another intermediate hop of length 25 (the lesser of 24.24 and 100, rounded up to the nearest integer) is executed, and the stream's penalty is reduced by 25, yielding a credit of 0.16. When the credit is non-negative, the stream becomes eligible to transfer another waiting packet, if any. In FIG. 15, a subsequent packet having a B×$\Delta$ product of 237.96 is processed. The packet is eligible for immediate transfer to the ready queue since its stream's credit is non-negative. A penalty of 237.96 is applied to the stream resulting in a credit of 237.80 (=0.16−237.96). An intermediate hop of 100 calendar slots (the lesser of 100 and 237.8) is executed and a credit of 100 is applied resulting in reducing the penalty to 137.8. Another intermediate hop of length 100 (the lesser of 100 and 137.8) is executed after which and the stream's penalty is further reduced by 100 to 37.8. Another intermediate hop of 38 (the lesser of 37.8 and 100, rounded up to the nearest integer) is executed, after which the penalty is offset and a credit of 0.20(=38−37.8) is obtained.

Figure 16:
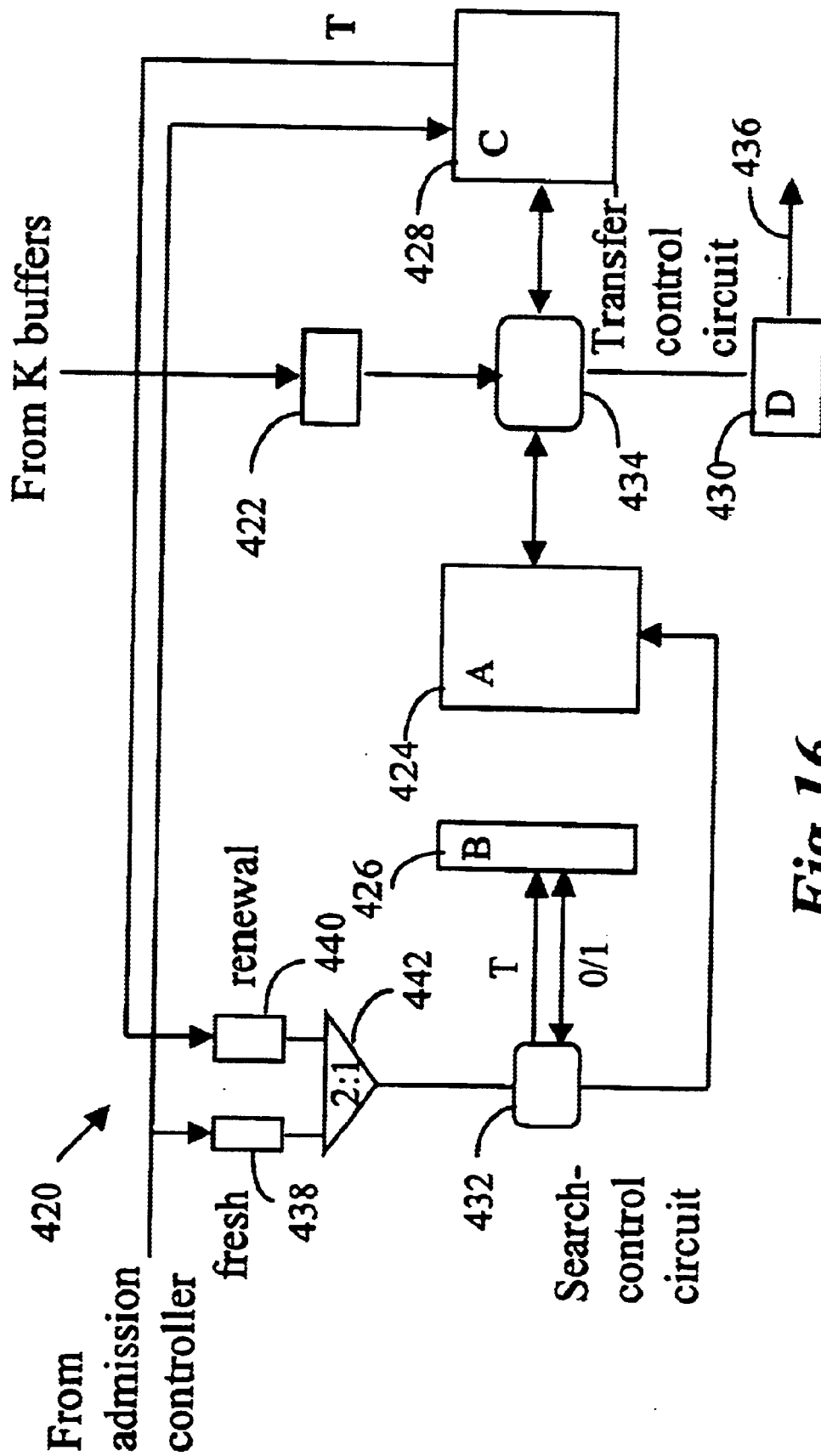
FIG. 16 shows a packet scheduling device according to the embodiments mentioned thus far.

FIG. 16 is a device for scheduling variable size packets based on the embodiments thus far described. The device 420 comprises a memory 422 storing K pointers to the K packet buffers (not shown) which feed its identifiers to a time-space map 424, memory A and a search memory 426, Memory B. The K packet buffers are preferably virtual buffers that actually share the same memory. The entries in memory A and memory B have one-to-one correspondence. There are a control data memory (table) 428, Memory C, and a ready queue 430, Memory D. A fresh stream queue 438 stores identifiers of new streams admitted by the admission control mechanism. A renewal queue 440 stores the identifiers of renewal streams as well as the desired insertion time slot T in the calendar (memory A), as determined by a transfer-control circuit 434.

Figure 17:
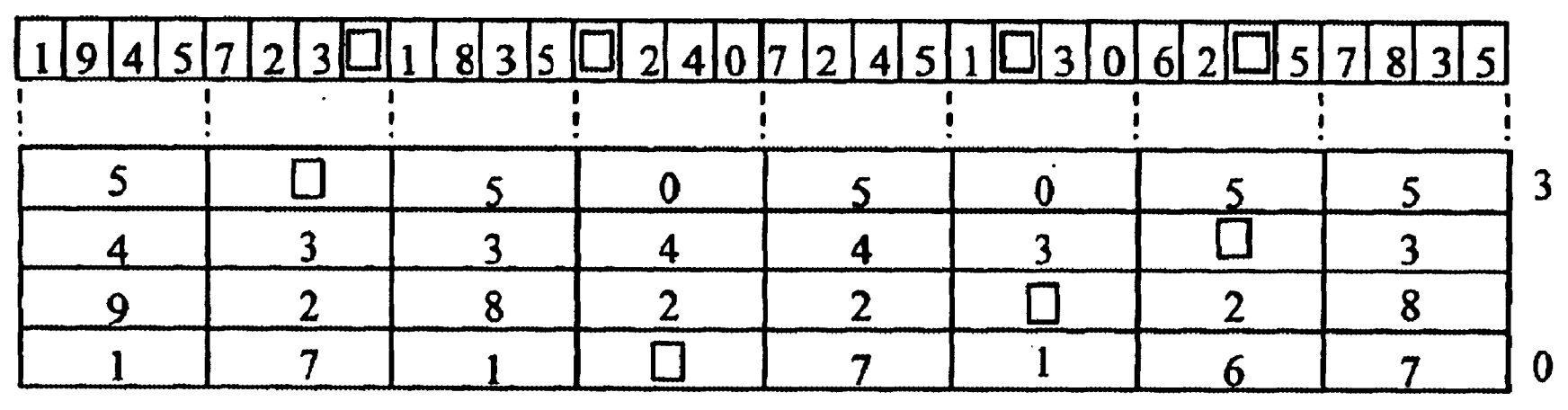
Figure 18:
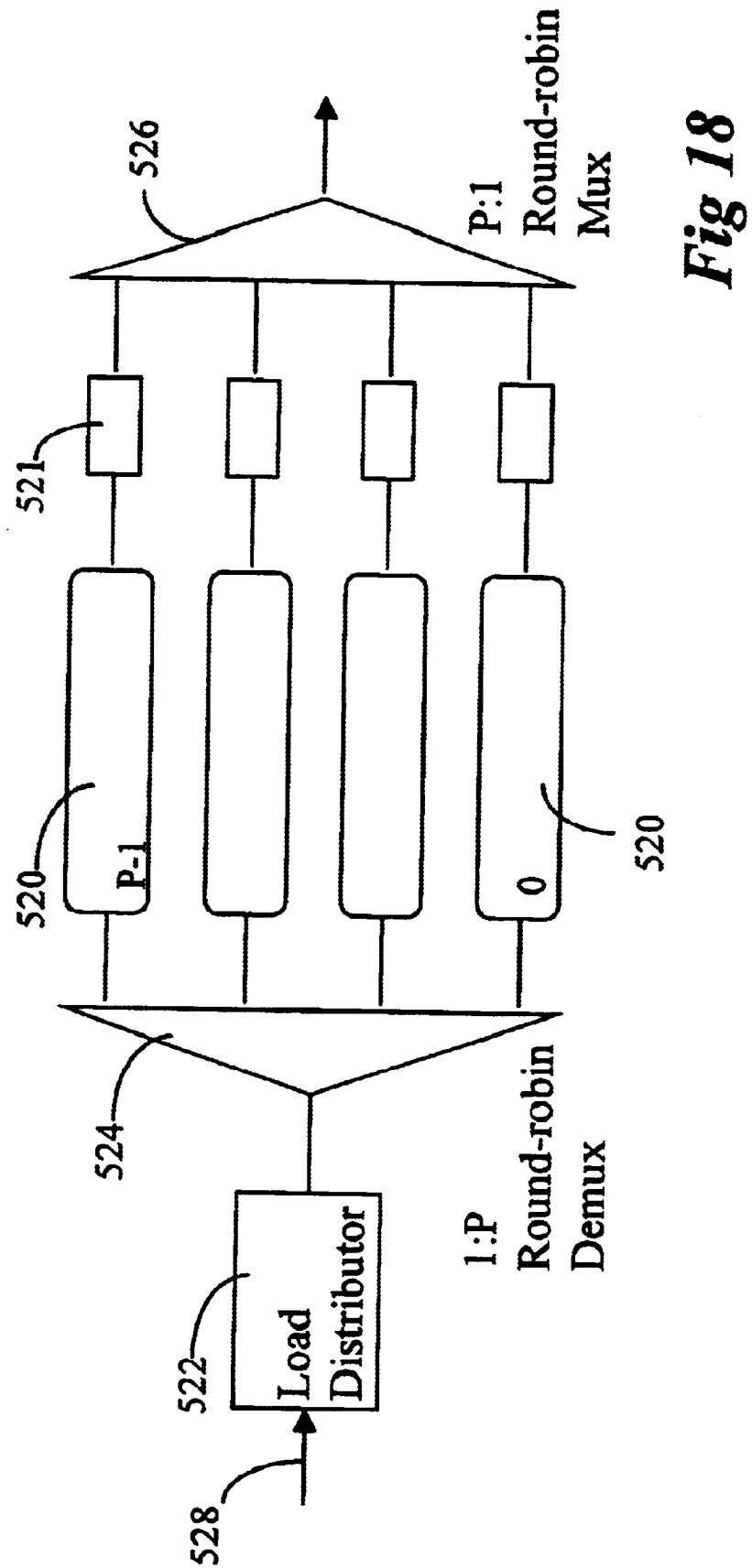
FIG. 18 shows a scheduling apparatus comprising several scheduling devices.

A search control circuit 432 searches memory B for a flag (a zero) indicating the existence of a corresponding vacancy in memory. $\Delta$ at, or following, the time slot T which is read from memory C (and provided by the transfer control circuit 434). Once found, the identifier of a renewal packet read from queue 440 is entered in the vacant slot in memory A. The only purpose of search circuit 432 is to separate the process of finding a free calendar slot in memory A, for a renewal stream or a new stream, from the process of determining the service eligibility of a stream whose identifier is read from memory A. Thus, the two processes can run simultaneously. The transfer control circuit 434 executes the algorithm according to either of the two earlier embodiments to determine the service eligibility. The transfer control circuit 434 enters the identifier of an eligible data stream to the ready queue, memory D, for transfer of the designated packet shown at 436. At the same time, the transfer control circuit 434 consults with the control data table 428, memory C, to determine and update specification of the data stream. When a new data stream is accepted by the admission control mechanism (not shown), its identifier is stored at a fresh queue 438 for data stream registration while a data stream returning for a further hop is queued at a renewal queue 440. A selector 442 always selects the renewal queue first if there is a data stream waiting, otherwise it chooses the new data stream from the fresh queue. A yet further embodiment FIG. 17 illustrates the basic principle underlying the further embodiment. In the figure, the top row indicates calendar slots holding the identifiers of data streams and some vacant slots. The four rows (each with L slots) in the lower parts of the figures indicate assignment of data streams in different ones of parallel scheduler modules. FIG. 18 shows an apparatus according to the embodiment shown in FIG. 17 that includes a number of scheduling modules operated in parallel.

The processes described above under earlier embodiments are limited by memory access speed. As the channel speed increases, higher speed rate controllers would be needed. As shown in FIG. 18, to extend the above design to very high capacities, a plurality of modules 520 operated in parallel, each of which is similar to the device 420 of FIG. 16 may be used. The admission control process may be user initiated or network initiated (based on measurements). In either case, the assignment of a new data stream to one of the P modules aims at equalizing the loads of the P modules, by the use of a load distributor 522, a 1:P demultiplexer 524 and a P:1 multiplexer 526. Multiplexer 526 merges the packets of streams indicated in the ready queues 521 in the shared link. An array G of P entries is zero initialized and used to track the load of each of the P modules. Each time a data stream is allocated a rate r, the P entries in array G are examined and the new data stream is assigned to the module of the least occupancy. The modules of the packet schedulers are preferably identical, each having a capacity of Q data streams and a speed of S packets per second. The combined speed of the P schedulers is P×S. The total capacity K of the combined P schedulers is P×Q. FIG. 17 illustrates the data stream assignment to the scheduler modules.

Load distribution circuit

A packet scheduling identifier includes two fields: a respective stream identifier and a packet length indicator. A packet is associated with a stream identifier, which is an integer number ranging from 0 to K-1. The packet distributor 522 includes a memory having K entries, each entry being 4 bits-wide, for example, to indicate one of 16 parallel scheduling modules. The memory is indexed by the stream number. Input 528 is a train of packet identifiers, each packet identifier including two fields. The first field is an identifier of the data stream to which the packet belongs, and the second field contains the length of the packet, preferably expressed in normalized units, i.e., as a ratio of the packet size to the nominal data unit. At the admission-control level, whether user initiated or network initiated, a new stream is assigned a stream number (identifier) between 0 and K-1, where K is the allowed maximum number of streams. If all the K identifiers are in use, a new request to accommodate a stream is delayed or rejected. The number K should be selected to be sufficiently large to virtually eliminate the need to delay or reject a request. At the packet level, a packet is associated with a stream upon arrival to a respective switching node. For scheduling purposes, packet identifiers as described above, including the associated stream identifier and the normalized packet length are used. The stream identifier is preferably 3-bytes long, allowing a maximum of 16 million streams to be scheduled. The normalized packet size field is preferably 2-bytes long. The identifiers of incoming packets 528 are directed by a packet distributor 522 into one of scheduling modules 520. An array of K entries is indexed by a packet's stream identifier and indicates the scheduling module to which an indexing stream is assigned.

A load distribution array G having P entries is used to assign a new data stream or reassign a registered data stream that requires transfer rate increases to one or more of the P scheduling modules. The load distribution array is initialized by a number indicative of the cumulative transfer rates assigned to each scheduling module. The load distributor 525 allocates a new stream, or may reassign a stream, to the least loaded scheduling module. If a data stream terminates its session, its allocated capacity (allocated transfer rate) is credited to a respective entry in array G. Similarly, when the allocated transfer rate of a data stream is reduced (through the admission control process), the respective entry in array G is credited accordingly.

Connection level under utilization

If the sum of the normalized allocated rates of all streams is less than unity, a null class is created to exploit the unused time intervals. In the fixed-cell environment, idle cell intervals can be granted to the null class without having any impact on other classes. With variable size packets, the null class must be explicitly incorporated in the class control table and served in the same manner as rate regulated classes.

Packet level under utilization

With a fixed packet size, unused time intervals belonging to any data stream can be granted to any other data stream since any packet can fit in any unused interval. With variable packets sizes, the packet time of a packet may be credited to any other data stream only if the other data stream has at least one waiting packet of any (non-zero) size.

What I claim as my invention is:

1. An apparatus for transfer rate control of K data streams into a shared channel, the data streams containing variable sized packets and being stored in K packet buffers and K being a positive integer, the apparatus comprising:

a pointer memory storing K pointers to the K packet buffers;

a memory A containing an expanded time-space map for storing identifiers of data streams eligible for transfer in an array of calendar slots;

a memory B having one-to-one correspondence with the memory A for locating a vacant calendar slot;

a control data memory C holding specification of the data streams;

a search-control circuit for locating a vacant slot indicator in memory B;

a ready queue memory D for storing the identifiers of the data streams ready for transfer; and a transfer control circuit for determining transfer eligibility of each data stream based on the specification contained in the control data memory C and enabling the transfer of the packet of one of K packet buffers to the ready queue memory D.

2. The apparatus for transfer rate control of K data streams into a shared channel in accordance with claim 1, comprising further:

P number of scheduling modules for transfer rate control, P being an integer greater than 1, K>P, and each module controlling the packet transfer of a subset of the K data streams;

a load distributor for assigning each of the K data streams to one of the P scheduling modules;

a 1:P demultiplexer for distributing packet identifiers to the P scheduling modules in accordance with utilization parameters indicative of the utilization of each module; and a P:1 multiplexer for combining the output packet identifiers of the P 5 scheduling modules.

3. The apparatus as claimed in claim 2 further comprising a scheduling-module assignment circuit having a load distribution circuit for assigning the data streams to the P scheduling modules according to utilization parameters indicated by the load distribution circuit.

4. The apparatus as claimed in claim 3 wherein the load distribution circuit assigns the capacity requirements of data streams selectively according to module vacancy.

5. The apparatus as claimed in claim 3 wherein the load distribution circuit assigns the capacity requirements of data streams according to a round-robin cyclic order.

6. A method of scheduling transfer of a plurality of data streams from a plurality of packet buffers to a shared channel by accessing calendar slots of a calendar, each data stream having packets of variable sizes and the calendar having an expanded time-space map forming the calendar slots for tracking service time of each data stream for eligibility for transfer, comprising steps of;

at each access of a calendar slot when a stream identifier is read,
(a) accumulating for each data stream a pre-calculated transfer credit;
(b) ascertaining a packet size of each data stream;
(c) declaring a data stream eligible for transfer if an accumulated transfer credit exceeds a predefined fraction of the packet size; and
(d) retaining a transfer credit remainder in excess of the packet size.

7. The method of scheduling transfer of a plurality of data streams according to claim 6 wherein the packet sizes are expressed in nominal data units, which unit is predetermined in relation to the capacity of the channel and the expected packet-size distribution.

8. The method as claimed in claim 7 comprising further steps of:
(a) registering specifications of each new data stream in a control data table, the specification including a calendar-hop length and a scaling factor for each data stream;
(b) reading J consecutive calendar slots in the expanded time-space map during each transfer time slot, J being a positive integer;
(c) determining if one or more data streams read in the entries are eligible for transfer;
(d) writing identifies of the eligible streams in a ready queue memory; and
(e) updating the control data table, including an accumulated credit and the calendar slot for the next service time for the data stream.

9. The method of scheduling transfer of a plurality of data streams according to claim 8 wherein calendar hops for each data streams are equal and independent of the packet sizes.

10. The method as claimed in claim 9 wherein the step of determining the eligibility of a stream is performed by the following algorithm:

*if C<0, then C←C+F;*

*if C≧0 and B=0, then C←0;*

*if C≧0 and B>0, then;*

*if C<αB: C←C+F;*

*if C≧αB: C←C+F+B;* wherein a parameter α is selected between 0 and 1, C is the accumulated credit, B is a normalized packet size of a waiting packet of a data stream, and F is a predetermined scaling factor.

11. The method as claimed in claim 9 wherein the step of determining the eligibility of a stream is performed by the following algorithm:

*if C<0, then C←C+F;*

*if C≧0 and B–0, then C←0;*

*if C≧0 and B>0, then C←C+F–B.*

12. The method as claimed in claim 9 wherein the step of determining the eligibility of a stream is performed by the following algorithm:

*B–0, then C←0;*

*if B>0 and C<B, then C←C+F;*

*if B>0 and C≧B, then C←C+F+B.*

13. The method as claimed in claim 10 wherein α is selected as a negative power of 2, preferably ½ or ¼.

14. The method of scheduling transfer of a plurality of data streams according to claim 8 wherein the accessing calendar slot is performed by a calendar hop which is determined by the size of a waiting packer for the data stream.

15. The method as claimed in claim 11 wherein if C>0 and B=0, for a given data stream, the credit C can be transferred to any other data stream that has at least one waiting packet.

16. A method scheduling the transfer of data streams having packets of variable sizes from a plurality of K packet buffers to a shared channel using an expanded calendar wherein a waiting packet from a packet buffer is transferred immediately to a ready queue at the calendar service time slot at which the data stream identity is read, and a future service time slot at which the data stream is eligible for subsequent packet transfer is determine by a calendar hop defined by the lesser of the packet size and a hop threshold, wherein if the product of a normalized packet size and a respective nominal calendar hop exceeds the hop threshold, the following steps are executed:
(a) incur a penalty for the respective traffic stream equal to said product;
(b) execute an intermediate hop determined by the lesser of the magnitude of the penalty and the hop threshold;
(c) accrue a hop credit in each intermediate hop proportional to the number of the calendar slots in the hop;
(d) reduce the penalty by the hop credit;
(e) repeat steps (b), (c), and (d) until the penalty is offset, and
(f) retain a credit fraction resulting from step (d).

17. The method as claimed in claim 16 wherein the transfer of packets of variable sizes from a plurality of K packet buffers to a shared channel comprises further steps of:
(a) registering the specifications of each data stream in a control data table;

(b) reading J consecutive calendar slots in the expanded calendar during each transfer time slot, determining if a read entry in the expanded calendar is a vacancy or a data stream identifier, J being a positive integer;

(c) determining if one or more data streams read in the entries are eligible for transfer;

(d) writing identifiers of the eligible streams in a ready queue memory; and (e) updating the control data table, including the accumulated credit and the calendar slot for the next service time for the data stream.

18. The method as claimed in claim 16 wherein the process of determining the eligibility of a data stream, the update of respective parameters, and calendar slots is implemented according to the algorithm;

If $C<0$; $m - \lceil C \rceil$, if $m>M$, $m \leftarrow M$, $C \leftarrow C+m$;

If $C \geq 0$ and $B-0$: $m-\lceil \Delta \rceil$, $C \leftarrow 0$;

If $C \geq 0$ and $B>0$: $X-B \times \Delta-C$, $m=\lceil X \rceil$, if $m>M$, $m$ $M$, $C \leftarrow m-X$;

$T \leftarrow T+m$ wherein T denotes a calendar slot for the next service time, C is an accumulated credit, B is a normalized packet size, and M is a hop threshold.

19. The method as claimed in claim 18 wherein if $C>0$ and $B=0$, for a given data stream, the credit C can be transferred to any other data stream that has at least one waiting packet.

20. The method as claimed in claim 16, wherein the plurality of K data streams include (K–V) rate-regulated data streams and V unregulated data streams accessing to the shared channel, comprising further steps of:

assigning K–V classes to the (K–V) rate-regulated data streams;

assigning a null class to the V unregulated data streams, allocating a transfer rate equal to the difference between the channel capacity R and the sum of the allocated transfer rates of the (K–V) regulated streams, and performing steps (a) to (f) on the null class of data streams.

21. The method of scheduling transfer of a plurality of rate-regulated and unregulated data streams from a plurality of packet buffers to a shared channel by accessing calendar slots of a calendar, each data stream having packets of variable sizes and the calendar having an expanded time-space map forming the calendar slots for tracking service time of each data stream for eligibility for transfer, comprising steps of:

at each access of a calendar slot,
assigning K classes to K rate-regulated data streams;
assigning a null class to the unregulated data streams, and
allocating a transfer rate equal to the difference between the channel capacity R and the sum of the allocated transfer rates of the K classes.

22. The method as claimed in claim 21 comprising further steps of:

accumulating for the null class of data streams a prefixed transfer credit;

monitoring a packet size of the null class of data streams;

declaring the null class of data streams eligible for transfer if an accumulated transfer credit exceeds the packet size; and retaining a transfer credit remainder in excess of the packet size.

* * * * *